United States Patent Office 3,826,736
Patented July 30, 1974

3,826,736
HYDROCARBON CONVERSION CATALYST AND PROCESS USING SAID CATALYST
James R. Kittrell, El Cerrito, Calif., assignor to Chevron Research Company, San Francisco, Calif.
Application Apr. 12, 1971, Ser. No. 133,401, now Patent No. 3,764,562, which is a continuation of abandoned application Ser. No. 834,067, June 17, 1969. Divided and this application Mar. 1, 1973, Ser. No. 337,219
Int. Cl. C10g *13/02, 37/06*
U.S. Cl. 208—59          8 Claims

ABSTRACT OF THE DISCLOSURE

Hydrocracking processes using a hydrocarbon conversion catalyst consisting essentially of: (a) a gel selected from silica-alumina gel, silica-alumina-titania gel and silica-alumina-zirconia gel, (b) at least one hydrogenating component selected from Group VIII metals and oxides and sulfides thereof and combinations of Group VIII metals and oxides and sulfides thereof with tin, and (c) a hydrogenating component selected from manganese and oxides and sulfides thereof.

---

This is a division of application Ser. No. 133,401, filed Apr. 12, 1971, now U.S. Pat. No. 3,764,562, which in turn was a continuation of U.S. application Ser. No. 834,067, filed June 17, 1969, now abandoned.

INTRODUCTION

This invention relates to catalytic hydrocracking of hydrocarbons, including petroleum distillates and solvent-deasphalted residue, to produce high-value fuel products including gasoline.

PRIOR ART

It is known that a hydrocracking catalyst may comprise a silica-alumina gel and a Group VIII hydrogenating component, and that the Group VIII hydrogenating component may be accompanied by an additional component, for example a Group VI component.

There has been a continuing search for further improvements in such catalysts, and in similar multi-component catalysts, particularly for hydrocracking uses.

OBJECTS

In view of the foregoing, objects of the present invention include providing an improved hydrocracking catalyst that has, compared with similar prior art catalysts:

(1) high hydrocracking activity; and
(2) high hydrocracking stability.

It is a further object of the present invention to provide a hydrocracking process using said improved catalyst that is capable of producing excellent-quality gasoline, jet fuel and other valuable fuel products, and to provide methods of operating the hydrocracking process in an integrated manner with other process units to achieve various advantageous results.

The present invention will best be understood, and further objects and advantages thereof will be apparent, from the following description when read in connection with the accompanying drawing.

DRAWING

Figure 1:
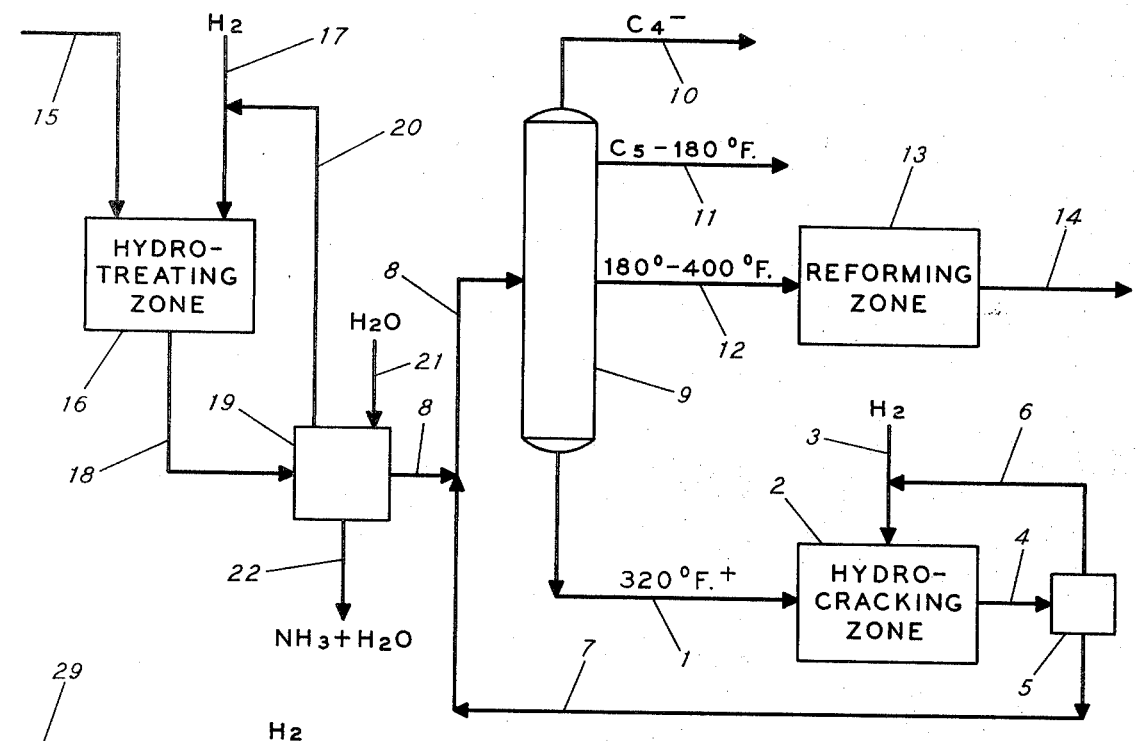
Figure 2:
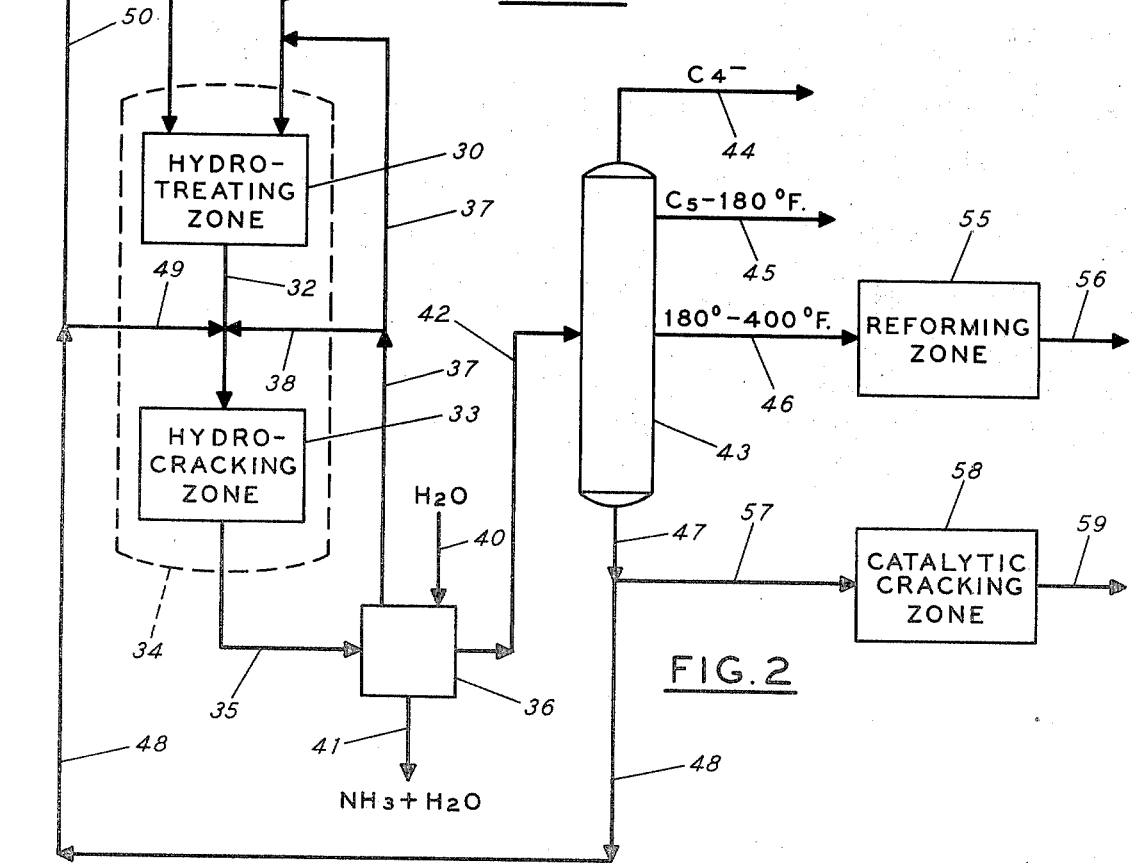

In the drawing, FIG. 1 is a diagrammatic illustration of apparatus and flow paths suitable for carrying out the process of several of the embodiments of the present invention, including embodiments wherein a hydrofining zone precedes the hydrocracking zone, and embodiments wherein a selected fraction from the hydrocracking zone is catalytically reformed;

FIG. 2 is a diagrammatic illustration of apparatus and flow paths suitable for carrying out the process of additional embodiments of the present invention, including embodiments wherein a hydrofining zone precedes a hydrocracking zone in a single reactor shell, and embodiments wherein a selected fraction from the hydrocracking zone is catalytically cracked.

STATEMENT OF INVENTION

In accordance with the present invention, it has been found that the foregoing objects are achieved by a hydrocarbon conversion catalyst consisting essentially of a unique combination of catalytic components, including a silica-containing gel, a Group VIII hydrogenating component and a hydrogenating component selected from manganese and oxides and sulfides of manganese.

More particularly, in accordance with the present invention there is provided a hydrocarbon conversion catalyst consisting essentially of:

(a) a gel selected from silica-alumina gel, silica-alumina-titania gel and silica-alumina-zirconia gel, and
(b) at least one hydrogenating component selected from Group VIII metals and oxides and sulfides thereof and combinations of Group VIII metals and oxides and sulfides thereof with tin, and
(c) a hydrogenating component selected from manganese and compounds thereof.

Said catalyst desirably will contain at least 15 weight percent silica, and sufficient alumina to provide an alumina-to-silica weight ratio of 15/85 to 80/20.

When said catalyst includes a silica-alumina-titania gel or a silica-alumina-zirconia gel, the titania or zirconia may be present in an amount of 1 to 15 weight percent of said catalyst, calculated as metal.

Said Group VIII hydrogenating component may be, for example, nickel, cobalt, platinum or palladium, in the form of the metal, oxide, sulfide or any combination thereof. Said hydrogenating component may be present in an amount of 0.01 to 15 weight percent, preferably 0.01 to 10 weight percent, based on said catalyst and calculated as metal. When said Group VIII hydrogenating component is nickel or compounds thereof or cobalt or compounds thereof, preferably it will be present in an amount of at least 5 weight percent, based on said catalyst and calculated as metal. When said Group VIII hydrogenating component is platinum or compounds thereof or palladium or compounds thereof, preferably it will be present in an amount of less than 5 weight percent, more preferably less than 3 weight percent, based on said catalyst and calculated as metal.

The manganese or compound of manganese may be present in an amount of 0.01 to 15 weight percent, based on said catalyst and calculated as metal.

The presence of tin or a compound thereof is particularly desirable when the Group VIII component is nickel or a compound thereof. The tin content of the catalyst may be 0.1 to 10 weight percent, based on the total catalyst and calculated as metal.

Another particular embodiment of the catalyst of the present invention is a porous Xerogel catalyst consisting essentially of:

(a) at least 15 weight percent silica,
(b) alumina, in an amount providing an alumina-to-silica weight ratio of 15/85 to 80/20,
(c) nickel, in the form of the metal, oxide, sulfide or any combination thereof, in an amount of 0.01 to 15 weight percent of said catalyst, calculated as metal,
(d) titanium oxide, in an amount of 1 to 10 weight percent of said catalyst, calculated as metal, (e) manganese, in the form of metal, oxide, sulfide or any combination thereof, in an amount of 0.01 to 15 weight percent of said catalyst, calculated as metal.

Still further in accordance with the present invention, there is provided a hydrocracking process which comprises contacting a hydrocarbon feed containing substantial amounts of materials boiling above 200° F. and selected from the group consisting of petroleum distillates, solvent-deasphalted petroleum residua, shale oils and coal tar distillates, in a reaction zone with hydrogen and the catalyst described above, at hydrocracking conditions including a temperature in the range 400° to 950° F., a pressure in the range 800 to 3500 p.s.i.g., a liquid hourly space velocity in the range 0.1 to 5.0 and a total hydrogen supply rate of 200 to 20,000 s.c.f. of hydrogen per barrel of said feedstock, and recovering from said reaction zone valuable products, including gasoline. The hydrocarbon feedstock preferably contains less than 1000 p.p.m. organic nitrogen, and more preferably less than 10 p.p.m. organic nitrogen. A prior hydrofining step may be used, if desired, to reduce the feed nitrogen content to the preferred level.

Further in accordance with the present invention, advantageous results are obtained by providing in the reaction zone, in addition to said catalyst, a separate second catalyst comprising a hydrogenating component selected from Group VI metals and compounds thereof, a hydrogenating component selected from Group VIII metals and compounds thereof, and a component selected from the group consisting of alumina and silica-alumina. Further in accordance with the present invention, said separate second catalyst may be located in said reaction zone in a bed disposed above the presently claimed catalyst. In the embodiments of the present invention discussed in this paragraph, no other prior hydrofining step generally will be necessary, because hydrofining is accomplished in one reaction zone concurrently with hydrocracking, together with some hydrogenation of aromatics.

Still further in accordance with the present invention, there is provided a hydrocracking process which comprises sequentially contacting a hydrocarbon feedstock and hydrogen with a first bed of catalyst and then with a second bed of catalyst, said catalyst beds both being located within a single elongated reactor pressure shell, said first bed of catalyst being located in an upper portion of said shell, the catalyst of said first bed comprising a hydrogenating component selected from the group consisting of Group VI metals and compounds thereof and Group VIII metals and compounds thereof, and a component selected from the group consisting of alumina and silica-alumina, the catalyst of said second bed comprising the catalyst of the present invention, maintaining said first bed of catalyst and said second bed of catalyst at a temperature in the range 400° to 950° F. and a pressure in the range 800 to 3500 p.s.i.g. during said contacting, maintaining the total supply rate of said hydrogen into said reactor shell from 200 to 20,000 s.c.f. of hydrogen per barrel of said feedstock, and recovering a gasoline product from the effluent of said second bed of catalyst.

The hydrocracking zone of the process of the present invention may be operated once through, or advantageously may be operated by recycling thereto materials from the effluent thereof that boil above 200° F., preferably above 400° F. All or a portion of these heavier materials advantageously may be catalytically cracked. The heavy gasoline fraction from the hydrocracking zone advantageously may be catalytically reformed.

HYDROCARBON FEEDSTOCKS

The feedstocks supplied to the hydrocracking zone in the process of the present invention are selected from the group consisting of petroleum distillates, solvent-deasphalted petroleum residua, shale oils and coal tar distillates. The feedstocks contain substantial amounts of materials boiling above 200° F., preferably substantial amounts of materials boiling in the range 350° F. to 950° F., and more preferably in the range 400° to 900° F. Suitable feedstocks include those heavy distillates normally defined as heavy straight-run gas oils and heavy cracked cycle oils, as well as conventional FCC feed and portions thereof. Cracked stocks may be obtained from thermal or catalytic cracking of various stocks, including these obtained from petroleum, gilsonite, shale and coal tar. As discussed hereinafter, the feedstocks may have been subjected to a hydrofining and/or hydrogenation treatment, which may have been accomplished by some hydrocracking before being supplied to the hydrocracking zone containing the catalyst of the present invention.

NITROGEN CONTENT OF FEEDSTOCKS

While the process of the present invention can be practiced with utility when supplying to the hydrocracking zone hydrocarbon feeds containing relatively large quantities of organic nitrogen, for example several hundred parts per million organic nitrogen, it is preferred that the organic nitrogen content be less than 10 parts per million organic nitrogen. A preferred range is 0.1 to 10 parts per million; more preferably, 0.1 to 5 parts per million. As previously discussed, a prior hydrofining step may be used, if desired, to reduce the feed nitrogen content to the preferred level. The prior hydrofining step advantageously may also accomplish hydrogenation and a reasonable amount of hydrocracking.

SULFUR CONTENT OF FEEDSTOCK

While the process of the present invention can be practiced with utility when supplying to the hydrocracking zone hydrocarbon feeds containing relatively large quantities of organic sulfur, it is preferable to maintain the organic sulfur content of the feed to that zone in a range of 0 to 3 weight percent, preferably 0 to 1 weight percent.

CATALYST COMPRISING A GROUP VIII COMPONENT AND A COMPONENT SELECTED FROM MANGANESE AND COMPOUNDS OF MANGANESE AND PREPARATION THEREOF

The catalyst preferably is prepared by cogelation of all components in a known manner. It has been found that a cogelled form of the catalyst is superior to one prepared by impregnation of the silica-containing component with one or more or the hydrogenation components.

The catalyst, preferably in hydrogel form as a result of cogelation of all components thereof, is dried in a conventional manner, and then desirably is activated in an oxygen-containing gas stream for 1 to 10 hours at 900° to 1600° F., preferably 2 to 8 hours at 1200° to 1500° F.

The finished catalyst may be sulfided in a conventional manner prior to use, if desired. If not presulfided, the catalyst will tend to become sulfided during process operation from any sulfur content that may be present in the hydrocarbon feed.

SEPARATE HYDROFINING CATALYST

(A) General

As previously indicated, advantageous results are obtained by providing in the reaction zone containing the hydrocracking catalyst of the present invention a separate second catalyst comprising a hydrogenating component selected from Group VI metals and compounds thereof, a hydrogenating component selected from Group VIII metals and compounds thereof, and a support selected from the group consisting of alumina and silica-alumina. Pellets or other particles of this separate second catalyst may be physically mixed with the catalyst of the present invention, but preferably are disposed in a separate catalyst bed located ahead of said hydrocracking catalyst in the same reactor shell, eliminating interstage condensation, pressure letdown and ammonia and hydrogen sulfide removal. In a preferred arrangement using downflow of hydrocarbon feed, the bed of separate second catalyst is located above said hydrocracking catalyst in the same reactor shell.

Where said separate second catalyst is located in the same reactor shell as the hydrocracking catalyst, it is preferably present in an amount in the range of 10 to 40 volume percent of the total amount of catalyst in the reactor.

In an arrangement more preferred than the ones discussed above in this section, the separate second catalyst may be located in a separate hydrofining reactor, operated under conventional hydrofining conditions, from the effluent of which ammonia or hydrogen sulfide, or both, and also hydrocarbon products, if desired, may be removed prior to hydrocracking the remaining hydrofined feedstock in a subsequent hydrocracking reactor in the presence of the catalyst of the present invention.

In any of the arrangements discussed in this section, the separate second catalyst preferably has hydrofining activity and hydrogenation activity, and even more preferably also has enough hydrocracking activity to convert 0.2 to 50, preferably 5 to 20, weight percent of the hydrocarbon feedstock to products boiling below the initial boiling point of the feedstock in a single pass. The hydrogenation activity preferably is sufficient to saturate or partially saturate a substantial portion of the organic oxygen, nitrogen and sulfur compounds in the feed to water, ammonia and hydrogen sulfide.

Preferably, said separate second catalyst contains nickel or cobalt or compounds thereof in an amount of 1 to 15 weight percent, calculated as metal, and molybdenum or tungsten or compounds thereof, in an amount of 5 to 30 weight percent, calculated as metal, with the remainder of the catalyst consisting of alumina, or silica-alumina containing up to 50 weight percent silica.

Particularly preferred examples of said separate second catalyst, comprising silica-alumina, are:

| | Percent by weight of total catalyst, calculated as metal | | | $SiO_2/Al_2O_3$, weight ratio |
|---|---|---|---|---|
| | Ni | Mo | W | |
| 1 | 4-10 | 15-25 | | 10/90 to 30/70 |
| 2 | 6-15 | | 15-30 | 30/70 to 50/50 |

It has been found that use of said separate second catalyst increases the gasoline yield from the hydrocracking stage containing the catalyst of the present invention compared with the gasoline yield from the hydrocracking stage when the identical feed thereto has not been first or concurrently processed in the presence of said separate second catalyst. The increased gasoline yield probably is related to the hydrogenation, in that more saturated hydrocarbon structures tend to crack more easily.

(B) Method of Preparation

Said separate second catalyst may be prepared by any conventional preparation method, including impregantion of an alumina or silica-alumina support with salts of the desired hydrogenating component, or cogelation of all components, with the latter method being preferred.

The catalyst of the present invention has activity and stability advantages over a conventional hydrocracking catalyst. It has been found that use of said separate second catalyst in the above-described arrangements further increases the stability of the catalyst of the present invention, compared with the stability of the latter catalyst when the identical feed thereto has not been first or concurrently processed in the presence of said separate second catalyst.

OPERATING CONDITIONS

The hydrocracking zone in the process of the present invention is operated at hydrocracking conditions including a temperature in the range 400° to 950° F., preferably 500° to 850° F., a pressure in the range 800 to 3500 p.s.i.g., preferably 1000 to 3000 p.s.i.g., a liquid hourly space velocity in the range 0.1 to 5.0, preferably 0.5 to 5.0, and more preferably 0.5 to 3.0. The total hydrogen supply rate (makeup and recycle hydrogen) to said zone is 200 to 20,000 s.c.f., preferably 2000 to 20,000 s.c.f., of hydrogen per barrel of said feedstock.

Where a separate hydrofining zone, which also may accomplish hydrogenation and some hydrocracking, is located ahead of the hydrocracking zone containing the catalyst of the present invention, the operating conditions in the separate hydrofining zone include a temperature of 400° to 900° F., preferably 500° to 800° F., a pressure of 800 to 3500 p.s.i.g., preferably 1000 to 2500 p.s.i.g., and a liquid hourly space velocity of 0.1 to 5.0, preferably 0.5 to 3.0. The total hydrogen supply rate (makeup and recycle hydrogen) is 200 to 20,000 s.c.f. of hydrogen per barrel of feedstock, preferably 2000 to 20,000 s.c.f. of hydrogen per barrel of feedstock.

Where a separate bed of hydrofining catalyst is located above a bed of the catalyst of the present invention in the same reactor shell, the space velocity through the bed of hydrofining catalyst will be a function of the space velocity through the hydrocracking catalyst bed and the amount of hydrofining catalyst expressed as a volume percent of the total catalyst in the reactor. For example, where the hydrofining catalyst is 25 volume percent of the total catalyst in the reactor, and the space velocity through the bed of hydrocracking catalyst is 0.9, the space velocity through the bed of hydrofining catalyst will be 2.7. Accordingly, the space velocity through the bed of hydrofining catalyst in the process of the present invention may range from 0.15 to 45.0.

The operating conditions in the reforming zone and catalytic cracking zone employed in various embodiments of the present invention are conventional conditions known in the art.

PROCESS OPERATION WITH REFERENCE TO DRAWING

Referring now to FIG. 1 of the drawing, in accordance with a primary embodiment of the present invention, a hydrocarbon feedstock as previously described, which in this case may boil above 400° F., is passed through line 1 into hydrocracking zone 2, which contains the hydrocracking catalyst of the present invention. As previously discussed, a separate second catalyst, previously described, may be located in hydrocracking zone 2. The feedstock is hydrocracked in hydrocracking zone 2 at conditions previously discussed, in the presence of hydrogen supplied through line 3. From hydrocracking zone 2 an effluent is withdrawn through line 4, hydrogen is separated therefrom in separator 5, and hydrogen is recycled to hydrocracking zone 2 through line 6. From separator 5, hydrocracked materials are passed through lines 7 and 8 to distillation column 9, where they are separated into fractions, including a $C_4^-$ fraction which is withdrawn through line 10, a $C_5$-180° F. fraction which is withdrawn through line 11, and a 180°-400° F. fraction which is withdrawn through line 12.

Still referring to FIG. 1, in accordance with another embodiment of the present invention, the 180°-400° F. fraction in line 12 is reformed under conventional catalytic reforming conditions in reforming zone 13, from which a catalytic reformate is withdrawn through line 14.

Still referring to FIG. 1, in accordance with another embodiment of the present invention, a hydrocarbon feedstock which is to be hydrofined and/or hydrogenated, and partially hydrocracked, if desired, in a separate hydrotreating zone prior to being hydrocracked in hydrocracking zone 2, is passed through line 15 to hydrotreating zone 16 containing a catalyst, as previously described, having hydrofining and/or hydrogenation activity. The feedstock is hydrotreated in zone 16 at conditions previously described, in the presence of hydrogen supplied through line 17. The effluent from hydrotreating zone 16 is passed through line 18 to separation zone 19, from which hydrogen separated from the treated feedstock is recycled through line 20 to hydrotreating zone 16. In zone 19, water entering through line 21 is used to scrub ammonia and other contaminants from the incoming hydrocarbon stream, and the ammonia, water and other contaminants are withdrawn from zone 19 through line 22. The scrubbed feedstock is passed through line 8 to distillation column 9 and thence to hydrocracking zone 2.

Referring now to FIG. 2, a hydrocarbon feedstock, as previously described, which in this case may boil above 400° F., is passed through line 29 to hydrotreating zone 30 containing a catalyst, as previously described, having hydrofining and/or hydrogenation activity. The feedstock is hydrofined and/or hydrogenated, and partially hydrocracked, if desired, in zone 30, at conditions previously described, in the presence of hydrogen supplied through line 31. The effluent from zone 30 is passed through line 32, without intervening impurity removal, into hydrocracking zone 33, where it is hydrocracked in the presence of the hydrocracking catalyst of the present invention. A separate second catalyst may be present in zone 33, as described in connection with zone 2 in FIG. 1. Hydrotreating zone 30 and hydrocracking zone 33 may be located in separate reactor shells, which may be operated at different pressures. Alternatively, and in a preferred manner of operation, hydrotreating zone 30 and hydrocracking zone 33 may be separate catalyst beds located in a single pressure shell 34, and the effluent from zone 30 may be passed to zone 33 without intervening pressure letdown, condensation or impurity removal. The effluent from zone 33 is passed through line 35 to separation zone 36, from which hydrogen is recycled through line 37 to hydrotreating zone 30. All or a portion of the recycled hydrogen may be passed through line 38 to hydrocracking zone 33, if desired. In separation zone 36, water entering through line 40 is used to scrub ammonia and other contaminants from the incoming hydrocarbon stream, and the ammonia, water and other contaminants are withdrawn from zone 36 through line 41. The effluent from zone 36 is passed through line 42 to distillation column 43, where it is separated into fractions, including a $C_4$– fraction which is withdrawn through line 44, a $C_5$-180° F. fraction which is withdrawn through line 45, a 180°–400° F.+ fraction which is withdrawn through line 46, and a fraction boiling above 400° F. which is withdrawn through line 47. The fraction in line 47 may be recycled through lines 48 and 49 to hydrocracking zone 33. All or a portion of the fraction in line 48 may be recycled to hydrotreating zone 30 through line 50, if desired.

Still referring to FIG. 2, in accordance with another embodiment of the present invention, the 180°–400° F. fraction in line 46 may be passed to a catalytic reforming zone 55, where it may be reformed in the presence of a conventional catalytic reforming catalyst under conventional catalytic reforming conditions to produce a catalytic reformate, which is withdrawn from zone 55 through line 56.

Still referring to FIG. 2, in another embodiment of the present invention, all or a portion of the fraction in line 47 may be passed through line 57 to catalytic cracking zone 58, which may contain a conventional catalytic cracking catalyst and which may be operated under conventional catalytic cracking conditions, and from which a catalytically cracked effluent may be withdrawn through line 59.

EXAMPLES

The following examples are given for the purpose of further illustrating the practice of the process of the present invention. However, it is to be understood that these examples are given by way of exemplification only, and are not intended in any way to limit the scope of the present invention.

Example 1

A cogelled catalyst was prepared by: (1) mixing aluminum chloride, water, acetic acid, nickel chloride and manganese chloride; (2) adding an aqueous solution of sodium silicate; (3) adding ammonia to cause precipitation and raise the pH of the mixture to 5.0; (4) further adding ammonia to raise the pH of the gel to 7.5; (5) washing the gel; (6) drying the gel; and (7) activating the gel at 1275° F. The gel contained 8.0 wt. percent nickel and 1.2 wt. percent manganese by analysis. The catalyst had a pore volume of 0.7 cc./g., a surface area of 337 m.²/g., and a particle density of 1.052. This catalyst is a superior hydrocracking catalyst.

Example 2

A catalyst was prepared as in Example 1, except that stannous chloride also was added in step (1). The catalyst is a superior hydrocracking catalyst.

What is claimed is:

1. A hydrocracking process which comprises contacting a hydrocarbon feedstock containing substantial amounts of materials boiling above 200° F. and selected from the group consisting of petroleum distillates, solvent-deasphalted petroleum residua, shale oils and coal tar distillates, in a reaction zone with hydrogen and a hydrocarbon conversion catalyst consisting essentially of:
   (a) a gel selected from silica-alumina gel, silica-alumina-titania gel and silica-alumina-zirconia gel,
   (b) at least one hydrogenating component selected from Group VIII metals and oxides and sulfides thereof and combinations of Group VIII metals and oxides and sulfides thereof with tin and compounds thereof, and
   (c) a hydrogenating component selected from manganese and compounds thereof,
at hydrocracking conditions including a temperature in the range 400° to 950° F., a pressure in the range 800 to 3500 p.s.i.g., a liquid hourly space velocity in the range 0.1 to 5.0, and a total hydrogen supply rate of 200 to 20,000 s.c.f. of hydrogen per barrel of feedstock, and recovering hydrocracked products from said reaction zone.

2. A process as in Claim 1, wherein said hydrocarbon feedstock contains 0.1 to 1000 p.p.m. nitrogen.

3. A process as in Claim 1, wherein said reaction zone contains, in addition to said hydrocarbon conversion catalyst, a separate second catalyst comprising a hydrogenating component selected from Group VI metals and compounds thereof, a hydrogenating component selected from Group VIII metals and compounds thereof, and a component selected from the group consisting of alumina and silica-alumina.

4. A process as in Claim 3, wherein said separate second catalyst is located in said reaction zone in a bed disposed above said hydrocarbon conversion catalyst.

5. A hydrocracking process which comprises sequentially contacting a hydrocarbon feedstock and hydrogen with a first bed of catalyst and then with a second bed of catalyst, said catalyst beds both being located within a single elongated reactor pressure shell, said first bed of catalyst being located in an upper portion of said shell, the catalyst of said first bed comprising a hydrogenating component selected from the group consisting of Group VI metals and compounds thereof and Group VIII metals and compounds thereof and a component selected from the group consisting of alumina and silica-alumina, the catalyst of said second bed being a hydrocarbon conversion catalyst consisting essentially of:
   (a) a gel selected from silica-alumina gel, silica-alumina-titania gel and silica-alumina-zirconia gel,
   (b) at least one hydrogenating component selected from Group VIII metals and compounds thereof and combinations of Group VIII metals and compounds thereof with tin and compounds thereof, and
   (c) a hydrogenating component selected from manganese and compounds thereof,
maintaining said first bed of catalyst and said second bed of catalyst at a temperature in the range 400° to 950° F.

and a pressure in the range 800 to 3500 p.s.i.g. during said contacting, maintaining the total supply rate of said hydrogen into said reactor shell from 200 to 20,000 s.c.f. of hydrogen per barrel of said feedstock, and recovering a gasoline product from the effluent of said second bed of catalyst.

6. A process as in Claim 5 wherein the effluent from said second bed of catalyst is separated into fractions, including a light gasoline fraction, a heavy gasoline fraction, and a fraction boiling generally higher than said heavy gasoline fraction.

7. A process as in Claim 6 wherein said heavy gasoline fraction is catalytically reformed.

8. A process as in Claim 6 wherein said fraction boiling generally higher than said heavy gasoline fraction is catalytically cracked.

References Cited

UNITED STATES PATENTS

| | | | |
|---|---|---|---|
| 2,463,508 | 3/1949 | Bates | 252—455 X |
| 3,280,040 | 10/1966 | Jaffe | 252—439 |
| 3,410,787 | 11/1968 | Kubicek | 208—57 |
| 3,523,912 | 8/1970 | Jaffe | 252—439 |
| 2,212,034 | 8/1940 | Morrell et al. | |
| 2,378,155 | 6/1945 | Newsome et al. | |
| 3,642,661 | 2/1972 | Jolley et al. | 252—439 |

DELBERT E. GANTZ, Primary Examiner

G. E. SCHMITKONS, Assistant Examiner

U.S. Cl. X.R.

208—60, 61, 111; 252—439, 453, 455 R, 465, 471

PO-1050
(5/69)

UNITED STATES PATENT OFFICE
CERTIFICATE OF CORRECTION

Patent No. 3,826,736     Dated July 30, 1974

Inventor(s) JAMES R. KITTRELL

It is certified that error appears in the above-identified patent and that said Letters Patent are hereby corrected as shown below:

Col. 4, line 7, "these" should read --those--.

Col. 4, line 10, "accomplished" should read --accompanied--.

Col. 5, line 55, "impregantion" should read --impregnation--.

Claim 1, lines 13-14, "tin and compounds thereof, and" should read --tin, and--.

Claim 1, lines 15-16, "manganese and compounds thereof," should read --manganese and oxides and sulfides thereof--.

Claim 5, lines 17-19, "metals and compounds thereof and combinations of Group VIII metals and compounds thereof with tin and compounds thereof, and" should read --metals and oxides and sulfides thereof and combinations of Group VIII metals and oxides and sulfides thereof with tin, and--.

Claim 5, lines 20-21, "manganese and compounds thereof," should read --manganese and oxides and sulfides thereof,--.

Signed and sealed this 29th day of October 1974.

(SEAL)
Attest:

McCOY M. GIBSON JR.            C. MARSHALL DANN
Attesting Officer              Commissioner of Patents